(12) United States Patent
Zafarifar et al.

(10) Patent No.: US 11,687,458 B1
(45) Date of Patent: Jun. 27, 2023

(54) MULTI-RESOLUTION CACHE

(71) Applicant: V-Silicon Semiconductor (Hefei) Co., Ltd, Hefei (CN)

(72) Inventors: Bahman Zafarifar, Eindhoven (NL); Jeroen Maria Kettenis, Geldern (DE)

(73) Assignee: V-Silicon Semiconductor (Hefei) Co., Ltd, Hefei (CN)

( * ) Notice: Subject to any disclaimer, the term of this patent is extended or adjusted under 35 U.S.C. 154(b) by 0 days.

(21) Appl. No.: 17/541,174

(22) Filed: Dec. 2, 2021

(51) Int. Cl.
*G06F 12/08* (2016.01)
*G06F 12/0811* (2016.01)
*G06F 12/0868* (2016.01)
*G06F 12/0871* (2016.01)
*G06F 12/0891* (2016.01)

(52) U.S. Cl.
CPC ...... *G06F 12/0811* (2013.01); *G06F 12/0868* (2013.01); *G06F 12/0871* (2013.01); *G06F 12/0891* (2013.01)

(58) Field of Classification Search
CPC ............. G06F 12/0811; G06F 12/0868; G06F 12/0871; G06F 12/0891
See application file for complete search history.

(56) References Cited

U.S. PATENT DOCUMENTS

| | | | |
|---|---|---|---|
| 9,007,388 B1 * | 4/2015 | Cook | G06T 15/50 345/611 |
| 2015/0154109 A1 * | 6/2015 | Fiterman | G06F 12/0886 711/126 |
| 2015/0331803 A1 * | 11/2015 | Heath | G06F 15/7821 711/125 |

OTHER PUBLICATIONS

Wang Jianpo, Yue Liqun, Xia Qing, Research on Hash Algorithm for Retrieval of Global Multi-resolution Terrain Cache Data, 2010 International Conference on Audio, Language and Image Processing, 2010, p. 980-984 (Year: 2010).*
Bellers, Erwin B., et al., "44.4: Motion Compensated Frame Rate Conversion for Motion Blur Reduction", SID, pp. 1545-1557, 2007, (2007), 1545-1557.

* cited by examiner

*Primary Examiner* — Masud K Khan
(74) *Attorney, Agent, or Firm* — Schwegman Lundberg & Woessner, P.A.

(57) ABSTRACT

A multi-resolution cache includes a first, second and third cache segments the first segment having a first resolution and the second and third segments having a second resolution, the second resolution less than the first resolution, the first and third cache segments communicatively coupled to an off-chip memory, the first and third cache segments configured to each receive a cache line of data having the first and second resolutions, a fourth and fifth cache segments having the second resolution, a first downscaler communicatively coupled to the first and fourth cache segments configured to reduce the resolution when a first resolution cached data is shifted from the first cache segment to the fourth cache segment, a first upscaler communicatively coupled to the all cache segments that have the second resolution, and is configured to increase the reduced resolution cached data to the first resolution and output it.

22 Claims, 7 Drawing Sheets

MULTI-RESOLUTION CACHE

BACKGROUND

Image processing operations such as spatial filtering and Motion-Compensated Frame Interpolation MCH (also called Motion-Estimation and Motion-Compensation, or MEMC) operate on local image neighborhoods, e.g. a local neighborhood in spatial domain. Typically, an image data cache is used to reduce the memory access bandwidth, which reads the image data only once from the memory and provides access to the local neighborhood from the cached data. A larger neighborhood therefore means a larger cache size, and therefore a higher cache cost.

BRIEF SUMMARY

In one aspect, a multi-resolution cache includes a first, second and third cache segments (102, 108, 110) having first, second and third resolutions respectively, the second resolution less than the first resolution and the third resolution less than the second resolution, the first, second, and third cache segments (102, 108, 110) communicatively coupled to an off-chip memory (120), the first, second and third cache segments (102, 108, 110) configured to receive one cache line of (image) data having the first, second and third resolutions from the off-chip memory (i.e., external to the cache, such as a DDR RAM, (buffered) streaming video, etc.), a fourth and fifth cache segment(106, 104) having the second and third resolutions respectively, a first downscaler (114) communicatively coupled to the first (102) and fourth (106) cache segments configured to reduce the resolution when a first resolution cache line is shifted from the first cache segment (102) to the fourth cache segment (106), a second downscaler (112) communicatively coupled to the fourth (106) and fifth cache segments (104) and configured to further reduce the resolution of the reduced resolution cached data when a reduced resolution cached data is shifted from the fourth cache segment (106) to the fifth cache (104) segment, a first (118) and second upscaler (116) communicatively coupled to the second and third cache segment (108, 110) respectively and also communicatively coupled to the fourth and fifth cache segment (106, 104) respectively configured to increase the reduced and further reduced cached data to the first resolution and output the increased resolution cached data.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
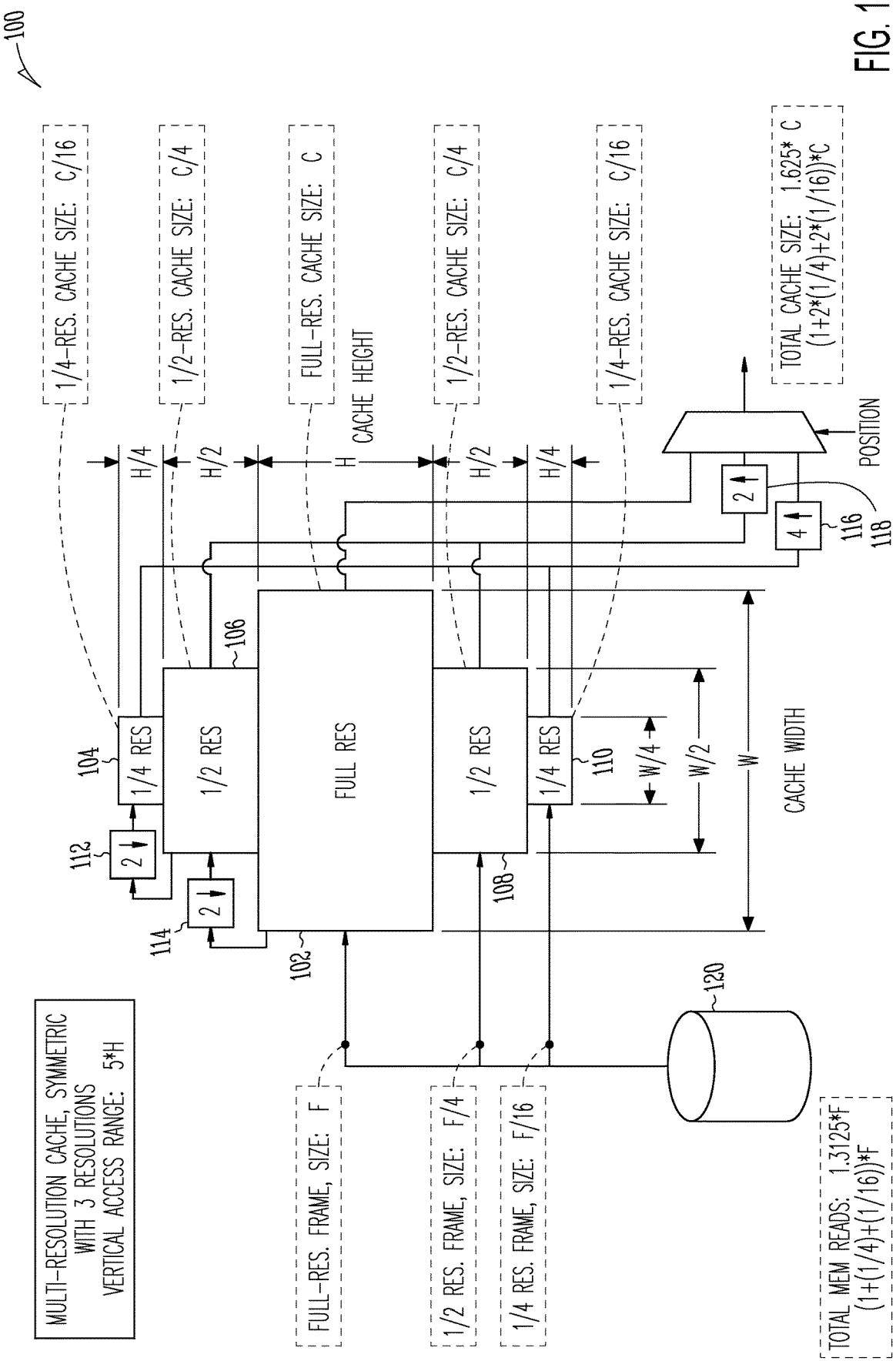
FIG. 1 illustrates a multi-resolution cache in accordance with one embodiment.

Embodiments use a multi-resolution cache whereby a part of the cache contains the image at a higher (e.g. full) resolution, and other parts of the cache contain the image at lower resolution. In this way, as compared to a single resolution cache, the same cache size can provide access to a larger neighborhood area, or in other words the same neighborhood size requires a lower cache size.

The cache system can generate the lower resolution data from the higher resolution data if this is available in the cache, and when a higher resolution data is not available in the cache it reads the lower resolution data from the memory.

The cache system provides data either at highest available resolution, or it provides a mixture of two resolutions where two cache resolution segments overlap or transition.

Image processing functions such as spatial or spatiotemporal can often benefit from a larger size of the local neighborhood (filter aperture size). Embodiment enable better image processing results by increasing the aperture size, whereby the data of pixels farther from the central pixel is delivered not at the resolution of the original image data (as located in the memory), but at a reduced resolution.

A practical example of an application that can benefit from a larger aperture, albeit at a reduced resolution, is MCFI. In MCFI, intermediate frames are generated between original video frame, e.g. to convert a 24 frame per second (fps) film to 120 fps. The MCFI needs to fetch the image pixels along their motion trajectory from adjacent input frames, for which a spatial aperture at each input frame is needed. The available local neighborhood (aperture) size defines the maximum amount of motion that can be correctly compensated for, prior to interpolation. For example, if the vertical available aperture size is 101 lines centered around the current pixel location, then objects with input frame to output frame motion of up to +/−50 vertical lines can be correctly interpolated, and objects with a larger vertical motion will result to an incorrect interpolation result. If we provide the pixels beyond the 101-line aperture at a lower resolution, then the MCFI can correctly perform the motion compensation, albeit at a lower output resolution.

Accordingly, embodiment provide a system for storing and providing access to the image data at multiple resolutions in the cache, thereby reducing the cache size for the same access range compared to a single resolution cache mechanism, or in other words by offering a larger access range for the same cache size compared to a single resolution cache mechanism.

The multi-resolution cache system includes:

1. At least 2 cache segments, one for storing the image at a high resolution, and one or more for storing the image at lower resolution(s), whereby different resolution segments may optionally partially or fully overlap each other.

2. A mechanism for filling the caches with the (image) data, whereby a given amount of old data (e.g. one image line) is removed from the cache, the data in the cache is shifted with the given amount (note that shifted means not necessarily physically, but also conceptually, e.g., using data pointers), and new data of the given amount is written to the cache, whereby higher-resolution data that is available in the cache or being read from the memory is used to generate the lower resolution data for lower resolution cache segments (e.g. by downscaling the available adjacent high resolution pixel data), and only data is read from the memory for which no higher resolution versions are available in the cache.

3. A mechanism for accessing (reading) the data of a desired (image) location from the cache, whereby:

High resolution data is returned if the data location is available in a high-resolution cache segment, and not in low resolution segments.

If the data location is not available in the high-resolution cache segment but does exist in a low-resolution cache segment, an approximation of the data is computed and returned using the low-resolution data, for example by interpolating (upscaling) the data from the direct neighborhood in the low-resolution cache segment.

If the data location is in an area where two resolution segments overlap or transition, then a "mixture" between (1) the data originated from the high-resolution cache segment and (2) the data originated from the low-resolution cache segment may be returned, whereby the mixture ratio is for example proportional to the distance of the data location to the two resolution segments. This mechanism ensures that the output data in the resolution overlap or resolution transition area does not have a sharp transition from one resolution to the other, but gradually fades between the two resolutions.

The said "mixture" operation could for example be implemented by "interpolation", such that the returned pixel value Pout will tend more towards the pixel value P1 from the segment-1 as the pixel distance D1 to segment-1 becomes smaller, and that the returned pixel value Pout will tend more towards the pixel value P2 from the segment-2 as the pixel distance D2 to segment-2 becomes smaller. For example, when using "linear interpolation", the above can be implemented as Pout=(P1*D2+P2*D1)/(D1+D2).

Alternatively, the "mixture" could return the highest resolution available in overlapping areas, rather than the above-mentioned smooth transition.

FIG. 1 illustrates a multi-resolution cache 100 in accordance with one embodiment. The multi-resolution cache 100 comprises a full resolution cache segment 102, half resolution cache segment 106 and half resolution cache segment 108, and quarter resolution cache segment 104 and quarter resolution cache segment 110 arranged vertically symmetrically. The half resolution cache segment 106 and half resolution cache segment 108 are placed vertically above and below the full resolution cache segment 102, respectively. The quarter resolution cache segment 104 and quarter resolution cache segment 110 are placed vertically above and below the half resolution cache segment 106 and half resolution cache segment 108 respectively. The multi-resolution cache 100 further comprises a downscaler 114 and downscaler 112 that respectively downscale resolution 50% from the full resolution cache segment 102 to the half resolution cache segment 106, and a further 50% from the half resolution cache segment 106 to the quarter resolution cache segment 104 (e.g., using a bilinear downscaler). For outputs from the quarter resolution cache segment 104 and 110 and the half resolution cache segment 106 and 108, respectively, a 4X upscaler 116 and 2X upscaler 118 increase the resolution from quarter and half resolution to full resolution (e.g., by using bilinear interpolation or other interpolation algorithms).

In the multi-resolution cache 100 the full resolution segment has a size C=H*W (where H indicates Height and W indicates Width), the ½ resolution segment has a size C/4=(H/2)*(W/2), and the ¼ resolution segment has a size C/16=(H/4)*(W/4). The total cache size is therefore 1.625*C data elements (1.625=1+2*(¼)+2*(¹⁄₁₆)).

Assuming a top-to-bottom image row scanning direction, the multi-resolution cache 100 can be filled as follows.

At each new full-resolution image row, the data of the full-resolution cache segment is shifted up one row and a new full-resolution (image) data row is read from the off-chip memory 120 and written at the empty (shifted) row of the full resolution cache segment 102.

At each new resolution image row, the data of the half resolution cache segment 108 at the bottom of FIG. 1 is shifted up one row and a new ½-resolution (image) data row is read from the off-chip memory 120 and written at the empty (shifted) row of the half resolution cache segment 108 at the bottom of FIG. 1.

At each new ¼ resolution image row, the data of the quarter resolution cache segment 110 at the bottom of FIG. 1 is shifted up one row and a new ¼-resolution (image) data row is read from the off-chip memory 120 and written at the empty (shifted) row of the quarter resolution cache segment 110 at the bottom of FIG. 1.

At each new ¼ resolution image row, the data of the half resolution cache segment 106 at the top of FIG. 1 is shifted one row and a new ½-resolution (image) data row is generated by using (e.g. downscaling with the downscaler 114) the cached data in the full resolution cache segment 102 and written at the empty (shifted) row of the half resolution cache segment 106 at the top of FIG. 1.

At each new ¼ resolution image row, the data of the quarter resolution cache segment 104 at the top of FIG. 1 is shifted one row and a new ¼-resolution (image) data row is generated by using (e.g. downscaling with the downsealer 112) the cached data in the half resolution cache segment 106 at the top of FIG. 1 and written at the empty (shifted) row of the quarter resolution cache segment 104 at the top of FIG. 1.

Therefore, in the multi-resolution cache 100, processing the entire image requires reading image data of each resolution only once in three resolutions (full-resolution, ½resolution, and ¼resolution), indicated in FIG. 1 by "Total mem reads: 1.3125*F" (1+¼+¹⁄₁₆=1.3125), where F stands for the size of the image frame.

Summarizing, the multi-resolution cache 100 offers cached data access at 3 resolutions, at the cost of 1.625*C cache elements and 1.312*F memory bandwidth.

If the scanning direction is not top-to-bottom, but bottom-to-top, left-to-right or right-to-left, then the order of shifting cache data and the filling the empty data row (or column) is adapted accordingly, so as to achieve the equivalent of the cache filling mechanism explained above, but in a mirrored or rotated order.

When accessing the cached data in low resolution cache segments 104 and 106, adjacent low-resolution data can be used to generate an approximation of the data of the requested location, for example by using a 2-dimensional spatial interpolation in case the data in the segment is stored in a reduced spatial resolution.

As will be discussed in the following embodiments note that:

The cache may have 2 or more stages.

Stacking can be done horizontally or vertically.

Data reduction factors (e.g. spatial downscale factors) can be dynamically chosen depending on the required access range and available cache size.

Horizontal and vertical data reduction (e.g. spatial downscale) factors of each resolution stage may be equal or may differ from each other.

The cache does not need to be positioned symmetrically around the current pixel location, but can be placed with a (horizontal and/or vertical) offset with respect to the current pixel location (so, called tilted positioning of the cache).

Cache data allocation for each resolution stage can be done dynamically and in a non-equal manner. For example, when needed, a larger amount of cache size can be allocated to the bottom cache segments as compared to the top cache segments.

Figure 2:
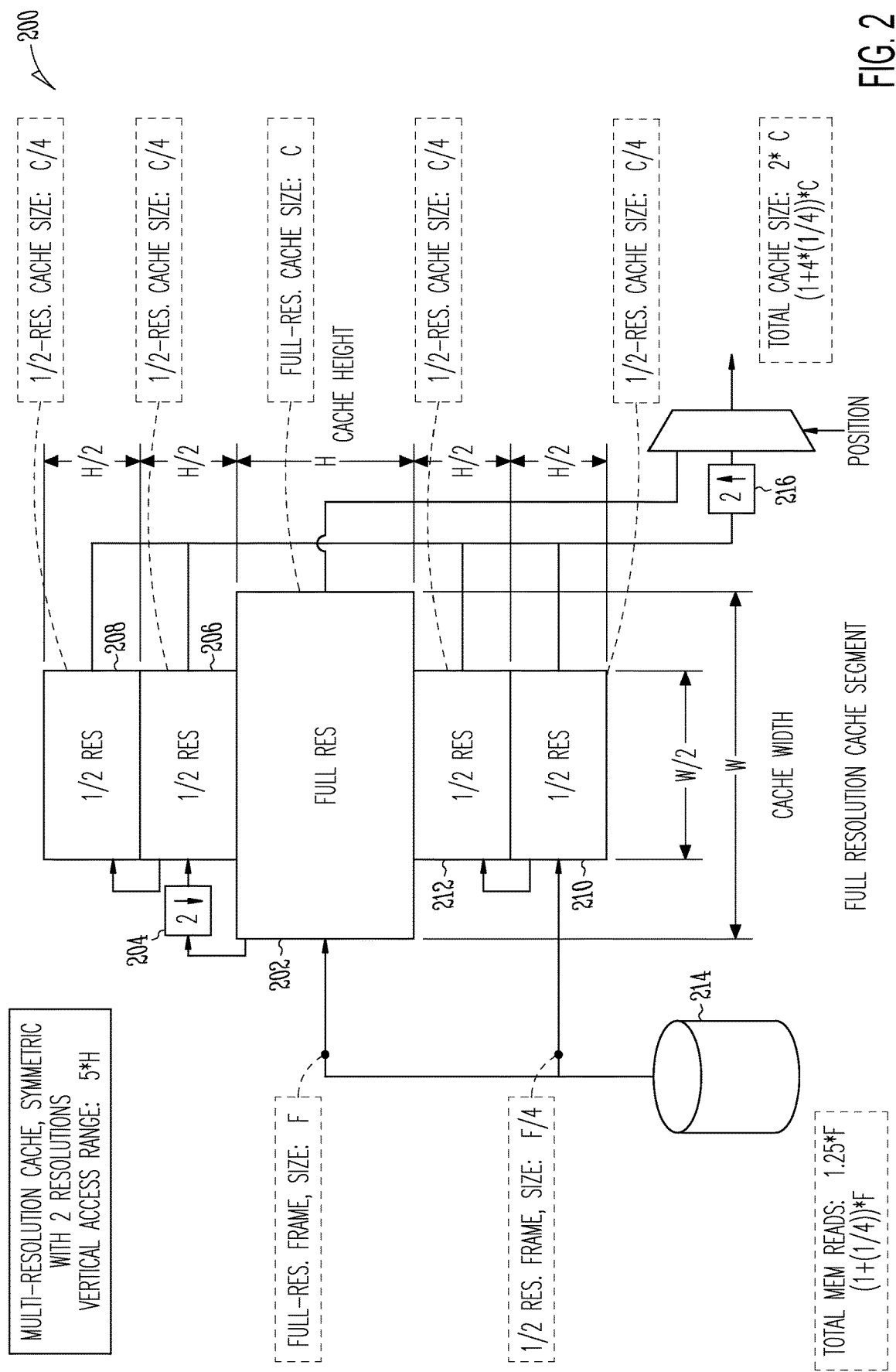
FIG. 2 illustrates a multi-resolution cache in accordance with one embodiment.

FIG. 2 illustrates a multi-resolution cache 200 in accordance with one embodiment. The multi-resolution cache 200 comprises a full resolution cache segment 202, a downscaler 204, a half resolution cache segment 206, a half resolution cache segment 208, a half resolution cache segment 210, a half resolution cache segment 212, and an upscaler 216. An off-chip memory 214 is communicatively coupled to the full resolution cache segment 202 and the half resolution cache segment 210. The multi-resolution cache 200 operates similarly to the multi-resolution cache 100 except, that there is no quarter resolution cache segment. Accordingly, only one downscaling operation is needed for generating the resolution data for filling the cache segment 206, from the full resolution data available in the cache segment 202. The ½ resolution data for filling the cache segment 210 is read from the memory. As shown, the multi-resolution cache 200 has symmetric top/bottom resolution segments (one downscaling operation is needed for generating the ½ resolution data from full resolution data available in the cache.). Required cache size is 2*C and required memory read bandwidth size is 1.25*F.

Figure 3:
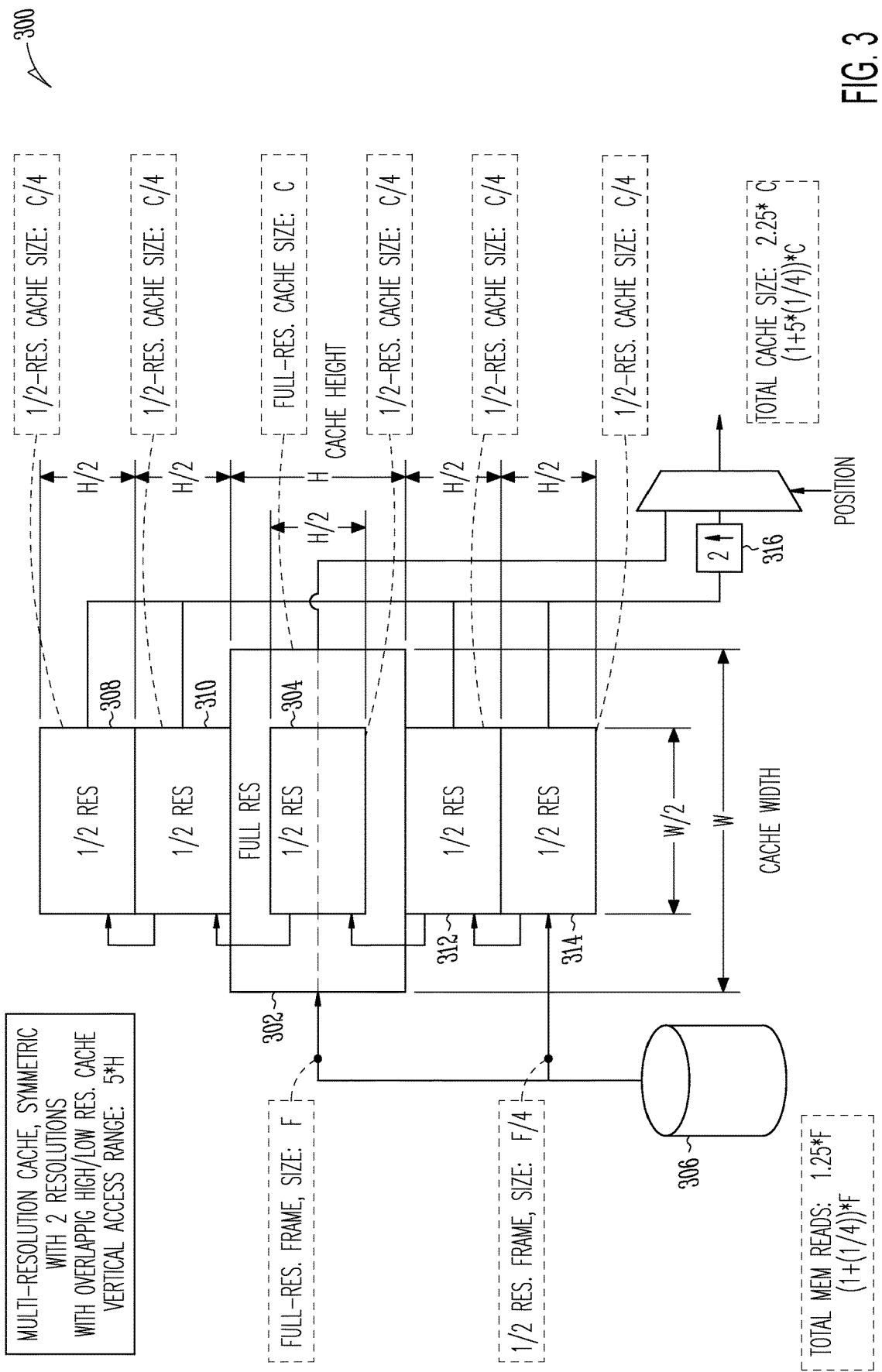
FIG. 3 illustrates a multi-resolution cache in accordance with one embodiment.

In an embodiment, cache segments 210 and 212 below the full-resolution cache segment 202 are effectively unified to form a single segment as it were, and cache segments 206 and 208 above the full-resolution cache segment 202 are effectively unified to form another single segment as it were. That is, there are only 3 segments: a full resolution segment and two ½ resolution (or other resolution) segments, FIG. 3 illustrates a multi-resolution cache 300 in accordance with one embodiment. The multi-resolution cache 300 works similarly to the multi-resolution cache 200 except that the full resolution cache segment 302 is fully overlapped with a half resolution cache segment 304, thereby eliminating the need for the downscaling operation. Specifically, the multi-resolution cache 300 comprises a full resolution cache segment 302., a half resolution cache segment 304, a half resolution cache segment 308, a half resolution cache segment 310, a half resolution cache segment 312, a half resolution cache segment 314, and an upscaler 316. An off-chip memory 306 is communicatively coupled to the full resolution cache segment 302, and the half resolution cache segment 314. Required cache size is 2.25*C and required memory read bandwidth size is 1.25*F.

Figure 4:
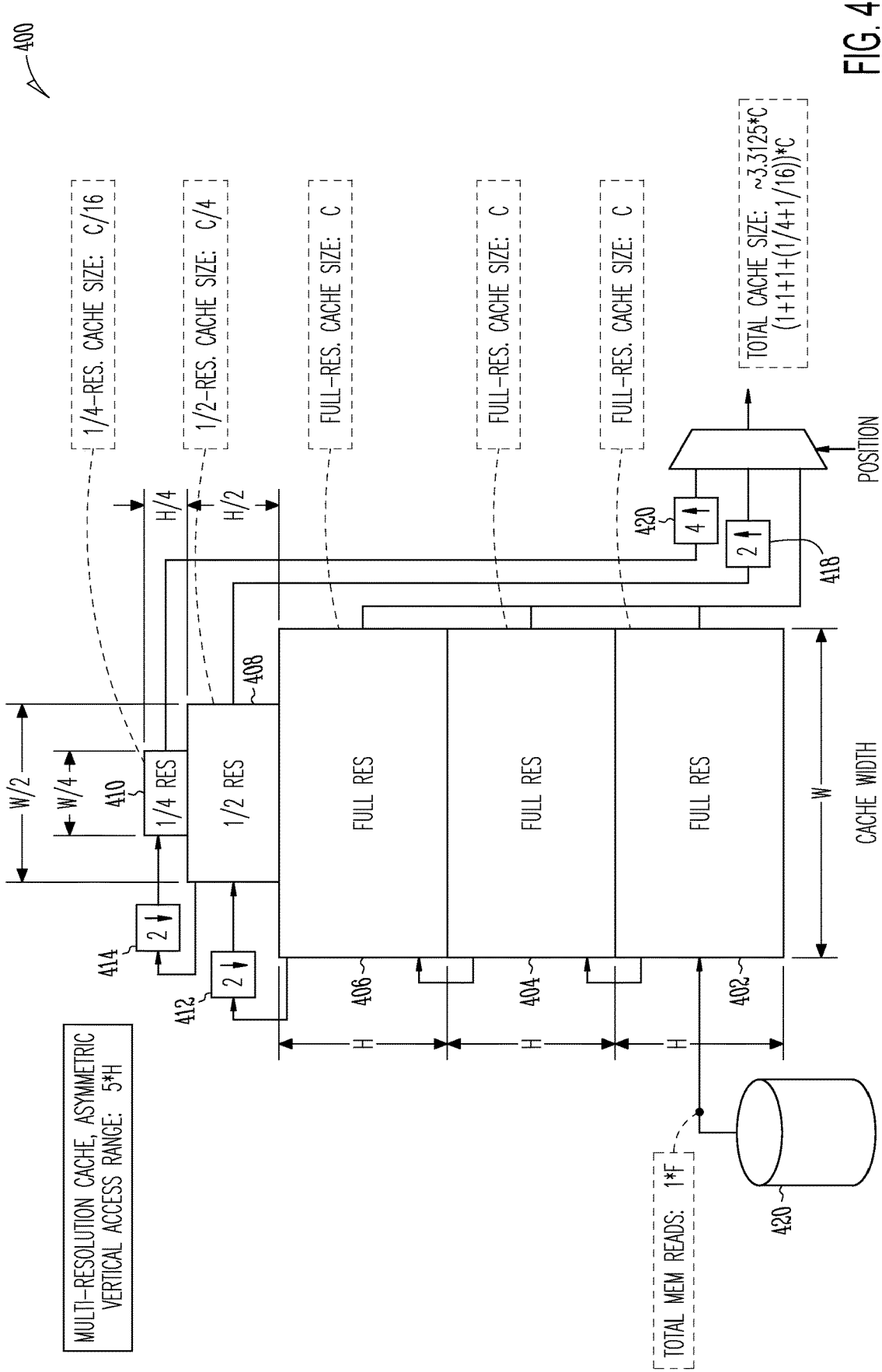
FIG. 4 illustrates a multi-resolution cache in accordance with one embodiment.

FIG. 4 illustrates a multi-resolution cache 400 in accordance with one embodiment. The multi-resolution cache 400 comprises a full resolution cache segment 402, a full resolution cache segment 404, a full resolution cache segment 406, a half resolution cache segment 408, a quarter resolution cache segment 410, a downscaler 412, a downscaler 414, an upscaler 418, and an upscaler 420. An off-chip memory 416 is communicatively coupled to the full resolution cache segment 402.

The multi-resolution cache 400, like the multi-resolution cache 100, has 3 resolutions, but with asymmetric top/bottom resolution segments. Two downscaling operations are needed for generating the ½ resolution data from full resolution data available in the full resolution cache segment 406, and for generating the ¼ resolution data from the ½ resolution data available in the half resolution cache segment 408. The use of 3 full resolution stages at the bottom half of the cache stacks eliminates the need for reading multiple image resolutions from the memory; only a single (full) resolution image needs to be read from the memory. Required cache size is 3.3125*C and required memory read bandwidth size is 1*F.

Figure 5:
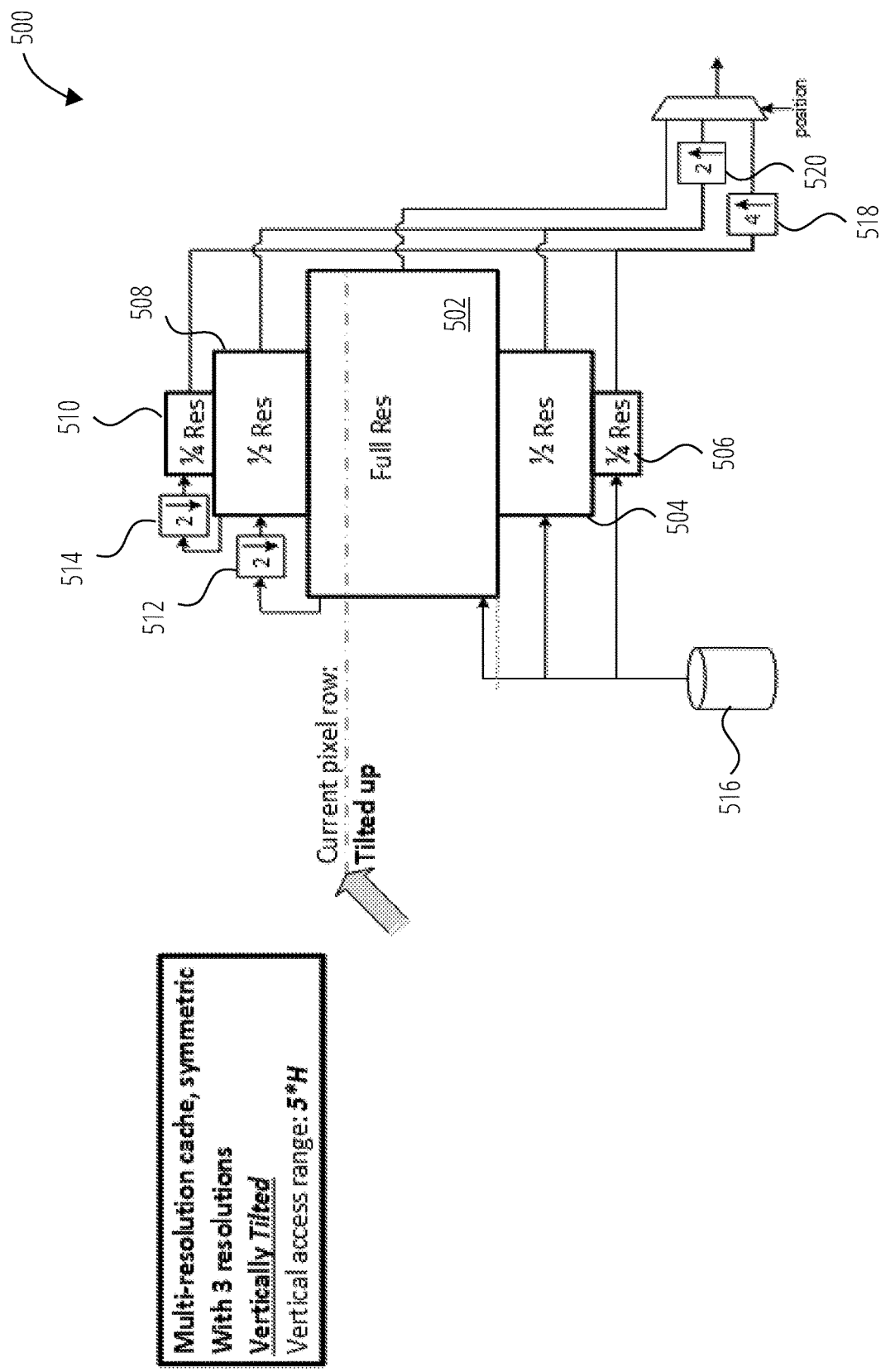
FIG. 5 illustrates a multi-resolution cache in accordance with one embodiment.

FIG. 5 illustrates a multi-resolution cache 500 in accordance with one embodiment, The multi-resolution cache 500 is similar to the multi-resolution cache 100 and comprises a full resolution cache segment 502, a half resolution cache segment 504, a quarter resolution cache segment 506, a half resolution cache segment 508, a quarter resolution cache segment 510, a downscaler 512, a downscaler 514, an upscaler 518, and an upscaler 520. However, the current pixel row is tilted up in this example (i.e., the current pixel row does not need to be centered in the middle the full resolution segment 502). An off chip memory 516 is communicatively coupled to the full resolution cache segment 502, the half resolution cache segment 504 and the quarter resolution cache segment 506.

Figure 6:
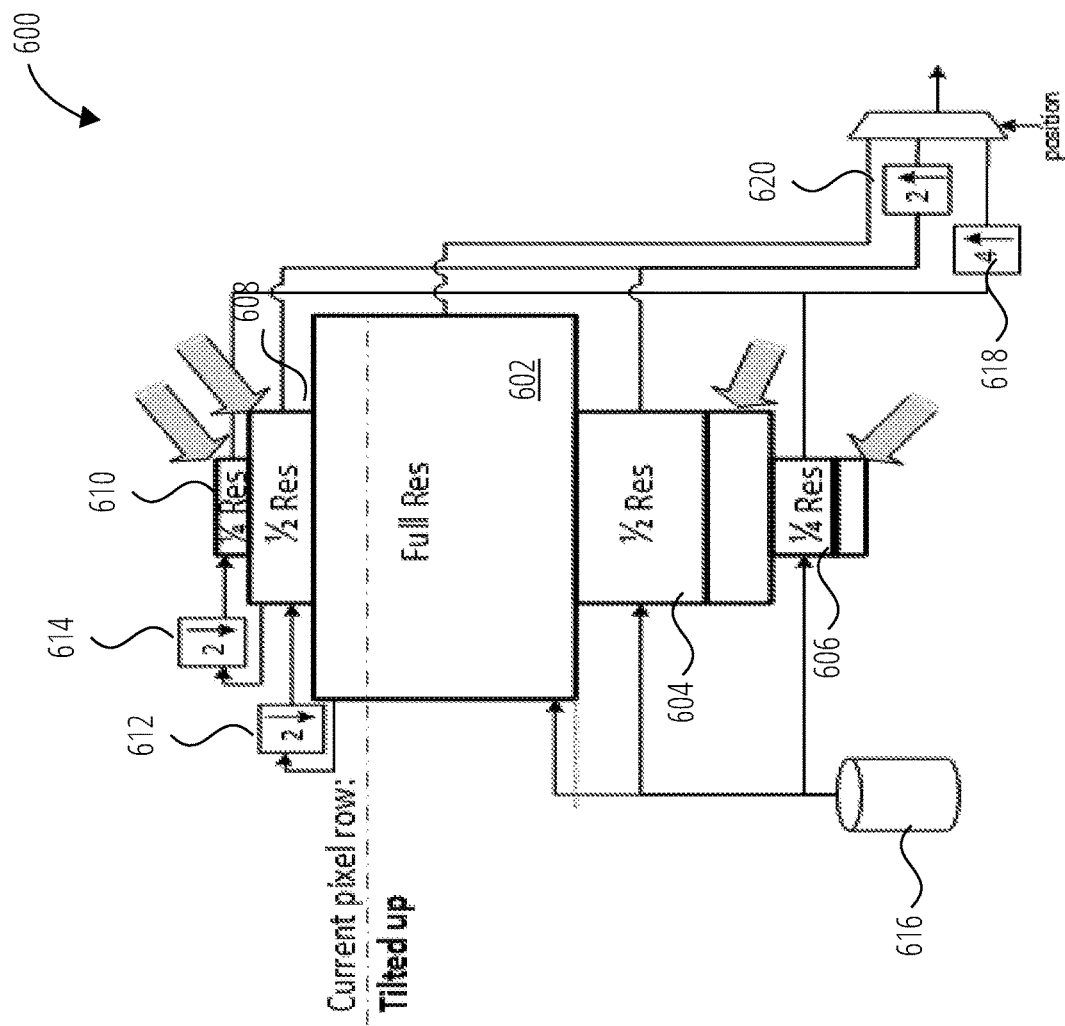
FIG. 6 illustrates a multi-resolution cache in accordance with one embodiment.

FIG. 6 illustrates a multi-resolution cache 600 in accordance with one embodiment. In this embodiment the size of all cache segments are dynamically allocated. The multi-resolution cache 600 comprises a full resolution cache segment 602, a half resolution cache segment 604, a half resolution cache segment 606, a half resolution cache segment 608, a quarter resolution cache segment 610, a downscaler 612, a downscaler 614, an upscaler 618, and an upscaler 620. The full resolution cache segment 602, the half resolution cache segment 604, and half resolution cache segment 606 are communicatively coupled to an off chip memory 616.

The multi-resolution cache 600 operates similarly to the multi-resolution cache 500 where the current pixel row is tilted up in this example (i.e., the current pixel row does not need to be centered in the middle the full resolution segment 602), with the difference that the cache data allocation is unequal (asymmetric) at the top and bottom of the full resolution segment 602 (more cache data allocated to the bottom, and less to the top, which can be done dynamically).

In its most basic embodiment, the multi-resolution cache system contains two segments, each having a different resolution, whereby the higher resolution cache segment obtains its content from the off-chip memory and the lower resolution cache segment obtains its content either from the off-chip memory in case the content is not available in the high resolution segment, or obtains its content by downscaling the content of the high-resolution segment in case the content is available in the high-resolution segment.

Figure 7:
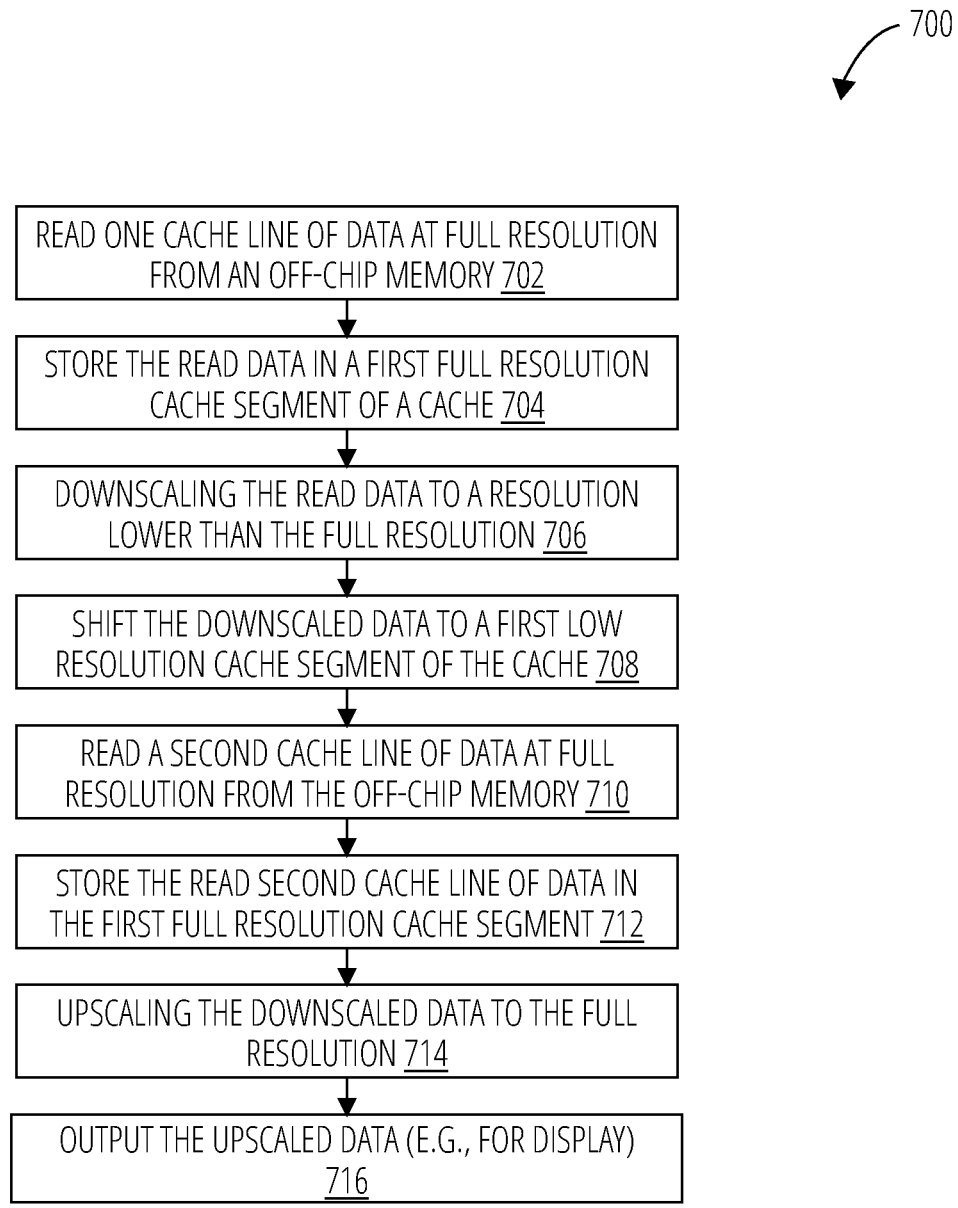
FIG. 7 illustrates a method in accordance with one embodiment.

FIG. 7 illustrates a method 700 in accordance with one embodiment. Any of the caches described herein may execute the method 700. In block 702, a multi-resolution cache reads one cache line of data at full resolution from an off-chip memory. In block 704, the multi-resolution cache stores the read data in a first full resolution cache segment of a cache. In block 706, the multi-resolution cache downscales the read data to a resolution lower than the full resolution when the data is shifted out of the full resolution cache. In block 708, the multi-resolution cache shifts the downscaled data to a first low resolution cache segment of the cache. In block 710, the multi-resolution cache reads a second cache line of data at full resolution from the off-chip memory, In block 712, the multi-resolution cache stores the read second cache line of data in the first full resolution cache segment. In block 714, the multi-resolution cache upscales the downscaled data to the full resolution. In block 716, the multi-resolution cache outputs the upscaled data (e.g., for display or other purpose).

The following examples describe various embodiments of methods, computer-readable media, and systems (e.g., machines, devices, or other apparatus) discussed herein.

1. A multi-resolution cache comprising:
a first, second and third cache segments having first, second and third resolutions respectively, the second resolution less than the first resolution and the third resolution less than the second resolution, the first, second, and third cache segments communicatively coupled to an off-chip memory, the first, second and third cache segments configured to receive a cache line of data having the first, second and third resolutions;
a fourth and fifth cache segment having the second and third resolutions respectively;
a first downscaler communicatively coupled to the first and fourth cache segments configured to reduce the resolution when the resolution cache line is shifted from the first cache segment to the fourth cache segment;
a second downscaler communicatively coupled to the fourth and fifth cache segments and configured to further reduce the resolution of the reduced resolution cached data when a reduced resolution cached data is shifted from the fourth cache segment to the fifth cache segment;
a first and second upscaler communicatively coupled to the second and third cache segment respectively and also communicatively coupled to the fourth and fifth cache segment respectively configured to increase the reduced and further reduced cached data to the first resolution and output the increased resolution cached data.

2. The multi-resolution cache of example 1, wherein the second resolution is half of the first resolution and the third resolution is one quarter of the first resolution.

3. The multi-resolution cache of any of the preceding examples, wherein the first resolution is full resolution.

4. The multi-resolution cache of any of the preceding examples, wherein the second, third, fourth and fifth cache segments are configured symmetrically about the first cache segment.

5. The multi-resolution cache of any of the preceding examples, wherein a cache data allocation of the second cache segment is not equal to a cache data allocation of the fourth cache segment.

6. The multi-resolution cache of any of the preceding examples, wherein the cache data size allocation and resolution of all cache segments is allocated dynamically or unequally, whereby the downscaler is adapted accordingly to generate the downscaled target resolution from the data source resolution.

7. The multi-resolution cache of any of the preceding examples, wherein a current pixel row is not centered in the first cache segment.

8. The multi-resolution cache of any of the preceding examples, further comprising a sixth cache segment having a resolution less than the first resolution and overlapping the first cache segment.

9. A method of operating the multi-resolution cache of any of the preceding examples, comprising:
reading one cache line of data at full resolution from the off-chip memory;
storing the read data in the first cache segment of the cache;
downscaling the data of the first cache segment to a resolution lower than the full resolution:
shifting the downscaled data to the fourth cache segment of the cache;
reading a second cache line of data at full resolution from the off-chip memory;
storing the read second cache line of data in the first cache segment;
upscaling the downscaled data to the full resolution; and
outputting the upscaled data.

10. A multi-resolution cache comprising:
a first and second and third cache segments the first segment having a first resolution and the second and third segments having a second resolution, the second resolution less than the first resolution, the first and third cache segments communicatively coupled to an off-chip memory, the first and third cache segments configured to receive a cache line of data having the first and second resolutions;
a fourth and fifth cache segments having the second resolution;
a first downscaler communicatively coupled to the first and fourth cache segments configured to reduce the resolution when the first resolution cached data is shifted from the first cache segment to the fourth cache segment;
a first upscaler communicatively coupled to the fourth and fifth cache segment configured to increase the reduced resolution cached data to the first resolution and output the increased resolution cached data.

11. The multi-resolution cache of any of the preceding examples, wherein the second cache segment is configured to receive cached data having the second resolution from the third cache segment when data is shifted from the third cache segment to the second cache segment.

12. The multi-resolution cache of any of the preceding examples, wherein the second resolution is ½ the first resolution.

13. The multi-resolution cache of any of the preceding examples, wherein the second, third, fourth and fifth cache segments are configured symmetrically about the first cache segment.

14. The multi-resolution cache of any of the preceding examples, wherein a cache data allocation of all cache segments are unequal.

15. The multi-resolution cache of any of the preceding examples, further comprising a sixth cache segment having a resolution less than the first resolution and overlapping the first cache segment.

16. A multi-resolution cache comprising:
a first, second and third cache segments having a first resolution, the first cache segment communicatively coupled to an off-chip memory, the first cache segment configured to receive a cache line of data having the first resolution;
a fourth and fifth cache segments having the second and third resolutions, respectively, the second resolution less than the first resolution and the third resolution less than the second resolution;
a first downscaler communicatively coupled to the fourth cache segment configured to reduce the resolution when a first resolution cache line is shifted from the third cache segment to the fourth cache segment;
second downscaler communicatively coupled to fourth and fifth cache segments and configured to further reduce the resolution of the reduced resolution cached data when the reduced resolution cached data is shifted from the fourth cache segment to the fifth cache segment; and
a first and second upscaler communicatively coupled to the fourth and fifth cache segments respectively configured to increase the reduced and further reduced cached data to the first resolution and output the increased resolution cached data.

17. The multi-resolution cache of any of the preceding examples, wherein the second resolution is half of the first resolution and the third resolution is one quarter of the first resolution.

18. The multi-resolution cache of any of the preceding examples, wherein a current pixel row is not centered in the third cache segment.

19. A method of operating the multi-cache system of any of the preceding examples, comprising:
reading one cache line of data at full resolution from the off-chip memory;
storing the read data in the first cache segment of the cache;
downscaling the data of the first cache segment to a resolution lower than the full resolution:
shifting the downscaled data to the fourth cache segment of the cache;
reading a second cache line of data at full resolution from the off-chip memory;
storing the read second cache line of data in the first cache segment;
upscaling the downscaled data to the full resolution; and
outputting the upscaled data.

20. A multi-resolution cache comprising:
a first and second cache segments the first segment having a first resolution and the second segment having a second resolution, the second resolution less than the first resolution, the first cache segment communicatively coupled to an off-chip memory, the first cache segment configured to receive a cache line of data having the first resolution;
a first downscaler communicatively coupled to the first and second cache segments configured to reduce the resolution of the received cache line data when the received first resolution cache line data is shifted from the first cache segment to the second cache segment;
a first upscaler communicatively coupled to the second cache segment configured to increase the reduced resolution cached data to the first resolution and output the increased resolution cached data.

21. The multi-resolution cache of any of the preceding examples, wherein the cache data size allocation and resolution of all cache segments is allocated dynamically or unequally, whereby the downscaler is adapted accordingly to generate the downscaled target resolution from the data source resolution.

22. The multi-resolution cache of any of the preceding examples, wherein the second cache segment is communicatively coupled to the off-chip memory and further configured to receive the cache line data from the off-chip memory at the second resolution when the cache line data is unavailable in the first cache segment.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the claims disclosed herein. Thus, the description is to be regarded as illustrative instead of limiting.

What is claimed is:

1. A multi-resolution cache comprising:
a first, second and third cache segments having first, second and third resolutions respectively, the second resolution less than the first resolution and the third resolution less than the second resolution, the first, second, and third cache segments communicatively coupled to an off-chip memory, the first, second and third cache segments configured to receive a cache line of data having the first, second and third resolutions;
a fourth and fifth cache segment having the second and third resolutions respectively;
a first downscaler communicatively coupled to the first and fourth cache segments configured to reduce the resolution when the resolution cache line is shifted from the first cache segment to the fourth cache segment;
a second downscaler communicatively coupled to the fourth and fifth cache segments and configured to further reduce the resolution of the reduced resolution cached data when a reduced resolution cached data is shifted from the fourth cache segment to the fifth cache segment;
a first and second upscaler communicatively coupled to the second and third cache segment respectively and also communicatively coupled to the fourth and fifth cache segment respectively configured to increase the reduced and further reduced cached data to the first resolution and output the increased resolution cached data.

2. The multi-resolution cache of claim 1, wherein the second resolution is half of the first resolution and the third resolution is one quarter of the first resolution.

3. The multi-resolution cache of claim 2, wherein the first resolution is full resolution.

4. The multi-resolution cache of claim 1, wherein the second, third, fourth and fifth cache segments are configured symmetrically about the first cache segment.

5. The multi-resolution cache of claim 1, wherein a cache data allocation of the second cache segment is not equal to a cache data allocation of the fourth cache segment.

6. The multi-resolution cache of claim 1, wherein the cache data size allocation and resolution of all cache segments is allocated dynamically or unequally, whereby the downscaler is adapted accordingly to generate the downscaled target resolution from the data source resolution.

7. The multi-resolution cache of claim 1, wherein a current pixel row is not centered in the first cache segment.

8. The multi-resolution cache of claim 1, further comprising a sixth cache segment having a resolution less than the first resolution and overlapping the first cache segment.

9. A method of operating the multi-resolution cache of claim 1, comprising:
reading one cache line of data at full resolution from the off-chip memory;
storing the read data in the first cache segment of the cache;
downscaling the data of the first cache segment to a resolution lower than the full resolution;
shifting the downscaled data to the fourth cache segment of the cache;

reading a second cache line of data at full resolution from the off-chip memory;

storing the read second cache line of data in the first cache segment;

upscaling the downscaled data to the full resolution; and outputting the upscaled data.

10. A multi-resolution cache comprising:

a first and second and third cache segments the first segment having a first resolution and the second and third segments having a second resolution, the second resolution less than the first resolution, the first and third cache segments communicatively coupled to an off-chip memory, the first and third cache segments configured to receive a cache line of data having the first and second resolutions;

a fourth and fifth cache segments having the second resolution;

a first downscaler communicatively coupled to the first and fourth cache segments configured to reduce the resolution when the first resolution cached data is shifted from the first cache segment to the fourth cache segment;

a first upscaler communicatively coupled to the fourth and fifth cache segment configured to increase the reduced resolution cached data to the first resolution and output the increased resolution cached data.

11. The multi-resolution cache of claim 10, wherein the second cache segment is configured to receive cached data having the second resolution from the third cache segment when data is shifted from the third cache segment to the second cache segment.

12. The multi-resolution cache of claim 10, wherein the second resolution is ½ the first resolution.

13. The multi-resolution cache of claim 10, wherein the second, third, fourth and fifth cache segments are configured symmetrically about the first cache segment.

14. The multi-resolution cache of claim 10, wherein a cache data allocation of all cache segments are unequal.

15. The multi-resolution cache of claim 10, further comprising a sixth cache segment having a resolution less than the first resolution and overlapping the first cache segment.

16. A multi-resolution cache comprising:

a first, second and third cache segments having a first resolution, the first cache segment communicatively coupled to an off-chip memory, the first cache segment configured to receive a cache line of data having the first resolution;

a fourth and fifth cache segments having the second and third resolutions, respectively, the second resolution less than the first resolution and the third resolution less than the second resolution;

a first downscaler communicatively coupled to the fourth cache segment configured to reduce the resolution when a first resolution cache line is shifted from the third cache segment to the fourth cache segment;

second downscaler communicatively coupled to the fourth and fifth cache segments and configured to further reduce the resolution of the reduced resolution cached data when the reduced resolution cached data is shifted from the fourth cache segment to the fifth cache segment; and a first and second upscaler communicatively coupled to the fourth and fifth cache segments respectively configured to increase the reduced and further reduced cached data to the first resolution and output the increased resolution cached data.

17. The multi-resolution cache of claim 16, wherein the second resolution is half of the first resolution and the third resolution is one quarter of the first resolution.

18. The multi-resolution cache of claim 16, wherein a current pixel row is not centered in the third cache segment.

19. A method of operating the multi-cache system of claim 16, comprising:

reading one cache line of data at full resolution from the off-chip memory;

storing the read data in the first cache segment of the cache;

downscaling the data of the first cache segment to a resolution lower than the full resolution;

shifting the downscaled data to the fourth cache segment of the cache;

reading a second cache line of data at full resolution from e off-chip memory;

storing the read second cache line of data in the first cache segment;

upscaling the downscaled data to the full resolution; and outputting the upscaled data.

20. A multi-resolution cache comprising:

a first and second cache segments the first segment having a first resolution and the second segment having a second resolution, the second. resolution less than the first resolution, the first cache segment communicatively coupled to an off-chip memory, the first cache segment configured to receive a cache line of data having the first resolution;

a first downscaler communicatively coupled to the first and second cache segments configured to reduce the resolution of the received cache line data when the received first resolution cache line data is shifted from the first cache segment to the second cache segment;

a first upscaler communicatively coupled to the second cache segment configured to increase the reduced resolution cached data to the first resolution and output the increased resolution cached data.

21. The multi-resolution cache of claim 20, wherein the cache data size allocation and resolution of all cache segments is allocated dynamically or unequally, whereby the downscaler is adapted accordingly to generate the downscaled target resolution from the data source resolution.

22. The multi-resolution cache of claim 20, wherein the second cache segment is communicatively coupled to the off-chip memory and further configured to receive the cache line data from the off-chip memory at the second resolution when the cache line data is unavailable in the first cache segment.

* * * * *